Patented Apr. 29, 1952

2,594,349

UNITED STATES PATENT OFFICE 2,594,349

MANUFACTURE OF ESTRONE

Martin Rubin, Washington, D. C., and Emanuel B. Hershberg, West Orange, and Erwin Schwenk, Montclair, N. J., assignors to Schering Corporation, Bloomfield, N. J., a corporation of New Jersey No Drawing. Application July 2, 1948, Serial No. 36,826

2 Claims. (Cl. 260—397.4)

This invention relates to a method for the manufacture of estrone and, more particularly, to a method for producing estrone by the pyrolytic aromatization of ring A of $\Delta^{1,4}$-androstadienedione-3,17.

The female sex hormone, estrone, is at present prepared by laborious and tedious isolation and purification processes from materials of biological origin such as the urine of the stallion, the pregnant mare and human. The isolation and purification of estrone from these sources in which it is present only in minute quantities is a matter of great technical difficulty because of the presence of related compounds such as equilin, equilinin and other similar substances. It is one of the objects of the present invention to provide a method of manufacture of estrone in a state of such high purity that its purification to material of therapeutic quality is a matter of great ease and simplicity.

In United States Patent 2,280,828, H. H. Inhoffen disclosed that the pyrolysis of $\Delta^{1,4}$-androstadienedione-3,17, hereinafter referred to as androstadienedione, at 250–350° C. leads to the formation of an isoequilin having a fourth double bond, and stated that when it is desired to produce compounds of the type of estrone, the pyrolysis products "must be further saturated by the attachment of hydrogen."

We have now found that estrone may be produced in high purity and good yields by heating androstadienedione to temperatures within the range 475° to 575° C. in the presence of a substantial excess of a hydrocarbon having a substantial rate of cracking at the temperature of treatment.

Particularly suitable are the higher aliphatic hydrocarbons and cyclic hydrocarbons containing at least one alicyclic ring.

Preferably, a solution of androstadienedione in the hydrocarbon is fed into a zone maintained at a temperature within the range of 475° to 575° C. The optimum rate of feeding will vary with the temperature. For example, at about 530° C. satisfactory results are obtained if about one-half to one liter per hour of a 0.2% solution of the androstadienedione in the hydrocarbon is passed through a tube one inch in diameter and 15 inches long, heated to temperature of 530° C., measured in the reaction space.

Other methods of feeding the androstadienedione to the reaction space may be used. For example, the finely powdered material may be fed to a stream of the hydrocarbon at the inlet end of the heated tube.

The following specific example is illustrative of the principles of the invention:

Four grams of androstadienedione dissolved in two liters of hot decalin are passed at the rate of about one liter per hour through a "Pyrex" glass tube one inch in diameter and 15 inches long, heated by means of an externally wound electric heating element to an internal temperature of 525° to 535° C. The effluent vapors are cooled and the estrone which separates as a pale yellow crystalline solid is removed by filtration. The filtrate which contains unreacted androstadienedione may be recycled through the furnace. About three grams of crude estrone crystals melting at 235° to 250° C. is obtained in two passages through the heating zone. On purification, for example by recrystallization from methanol, pure estrone melting at 258°–260° C. is obtained. The synthetic estrone thus produced is indistinguishable from the natural product in optical rotation, melting point, ultraviolet absorption and biological activity. From it may be prepared in the usual manner derivatives such as the acetate, benzoate and semicarbazone which likewise are indistinguishable from similar derivatives of natural estrone.

Instead of the decalin, other hydrocarbons having a substantial rate of cracking at 525° to 535° C. may be used in the foregoing example, for example, mineral oil and tetralin. In general, the estrone crystallizes substantially completely from the cooled condensed effluent, or it may be extracted from the effluent with aqueous alkali followed by acidification of the alkali solution.

We claim:

1. A method of making estrone which comprises passing through a zone heated to a temperature of from about 475° to about 575° C. a solution of $\Delta^{1,4}$-androstadienedione-3,17 in a substantial excess of a hydrocarbon having a substantial rate of cracking at the temperature of the heated zone and recovering estrone from the reaction product.

2. A method of making estrone which comprises passing through a zone heated to a temperature of about 530° C. a solution of $\Delta^{1,4}$-androstadienedione-3,17 in substantial excess of a hydrocarbon having a substantial rate of cracking at the temperature of the heated zone and recovering estrone from the reaction product.

MARTIN RUBIN.
EMANUEL B. HERSHBERG.
ERWIN SCHWENK.

REFERENCES CITED

The following references are of record in the file of this patent:

UNITED STATES PATENTS

| Number | Name | Date |
|---|---|---|
| 2,280,828 | Inhoffen | Apr. 28, 1942 |